(12) United States Patent
Doig (10) Patent No.: US 9,493,314 B2
(45) Date of Patent: Nov. 15, 2016

(54) WEAR RESISTANT SLURRY PIPE FITTING

(76) Inventor: Scott Doig, Lesmurdie (AU)

( * ) Notice: Subject to any disclaimer, the term of this patent is extended or adjusted under 35 U.S.C. 154(b) by 318 days.

(21) Appl. No.: 13/185,900

(22) Filed: Jul. 19, 2011

(65) Prior Publication Data

US 2012/0007354 A1 Jan. 12, 2012

Related U.S. Application Data

(63) Continuation of application No. PCT/AU2010/000051, filed on Jan. 20, 2010.

(30) Foreign Application Priority Data

Jan. 28, 2009 (AU) ................................. 2009900306

(51) Int. Cl.
*F16L 43/00* (2006.01)
*B65G 53/52* (2006.01)

(52) U.S. Cl.
CPC ........... *B65G 53/523* (2013.01); *F16L 43/002* (2013.01); *B65G 2207/48* (2013.01)

(58) Field of Classification Search
USPC .......... 285/93, 129.1, 148.25, 148.27, 284.1; 406/11, 15, 194
See application file for complete search history.

(56) References Cited

U.S. PATENT DOCUMENTS

| | | | |
|---|---|---|---|
| 148,103 A * | 3/1874 | Girtanner et al. ............ | 156/534 |
| 444,038 A * | 1/1891 | Beach .................... | B65G 53/58 406/194 |
| 1,108,918 A * | 9/1914 | Lob ............... | 406/192 |
| 1,246,189 A | 11/1917 | Vanderlip | |
| 1,289,154 A * | 12/1918 | Girtanner et al. ............ | 406/193 |
| 1,518,705 A | 12/1924 | Raun | |
| 2,911,235 A * | 11/1959 | Stumbough ...................... | 285/93 |
| 2,916,441 A * | 12/1959 | Kruse, Jr. ................ | B01J 8/082 208/152 |
| 3,314,734 A | 4/1967 | Lewis | |
| 3,350,832 A | 11/1967 | Persson | |
| 4,009,912 A * | 3/1977 | Mraz ...................... | B65G 53/14 406/11 |

(Continued)

FOREIGN PATENT DOCUMENTS

| | | |
|---|---|---|
| CN | 1277664 A | 12/2000 |
| CN | 2654562 Y | 11/2004 |

(Continued)

OTHER PUBLICATIONS

CN Office Action of corresponding PCT/AU2010/000051 Application No. 201080005670.2 dated Feb. 1, 2013 with English Translation.

(Continued)

*Primary Examiner* — David E Bochna
(74) *Attorney, Agent, or Firm* — Edell, Shapiro & Finnan, LLC (57) ABSTRACT

A wear resistant pipe fitting includes an inlet end in fluid communication, in use, with a first linear pipe segment, and an outlet end in fluid communication, in use, with a second linear pipe segment. The pipe fitting includes a first eccentric reducer arranged to receive a slurry or pipeline fluid from the first linear pipe section and deliver the slurry or pipeline fluid to a second eccentric reducer; the second eccentric reducer arranged to receive the slurry or fluid from the first eccentric reducer and deliver the slurry or pipeline fluid to the second linear pipe section; and, a flow interrupter device is positioned within the first eccentric reducer for disrupting the flow of the slurry or pipeline fluid before the slurry or fluid enters the second eccentric reducer.

20 Claims, 7 Drawing Sheets

(56) References Cited

U.S. PATENT DOCUMENTS

| | | | |
|---|---|---|---|
| 4,199,010 A | | 4/1980 | McGuth et al. |
| 4,387,914 A | | 6/1983 | Paulson et al. |
| 4,554,721 A | | 11/1985 | Carty et al. |
| 4,641,864 A | | 2/1987 | Heine et al. |
| 4,733,889 A | | 3/1988 | Haines |
| 4,767,243 A | | 8/1988 | Brannstroom |
| 4,995,645 A | | 2/1991 | Pausch |
| 5,069,582 A | * | 12/1991 | Young .................... B65G 53/14 406/153 |
| 6,609,871 B2 | * | 8/2003 | Pfeiffer et al. ............... 414/328 |
| 2004/0065830 A1 | * | 4/2004 | Boon et al. .............. 250/339.11 |

FOREIGN PATENT DOCUMENTS

| | | |
|---|---|---|
| CN | 200995913 Y | 12/2007 |
| CN | 2455668 Y | 10/2010 |
| DE | 168922 | 3/1905 |
| DE | 581068 C | 7/1933 |
| FR | 2566875 A1 | 1/1986 |
| FR | 2829220 | 3/2003 |
| FR | 2829220 A1 | 3/2003 |
| JP | 59017419 A | 1/1984 |
| JP | 2229904 A | 9/1990 |
| JP | H05116756 A | 5/1993 |
| SU | 1245523 A1 | 7/1986 |
| WO | 02054048 A1 | 7/2002 |

OTHER PUBLICATIONS

Japanese Office Action for JP Patent Application No. 2011-546528, dated Jan. 21, 2014 with English translation, 4 pages.

* cited by examiner

WEAR RESISTANT SLURRY PIPE FITTING

CROSS REFERENCE TO RELATED APPLICATIONS

This application is a continuation of PCT/AU2010/000051 filed on Jan. 20, 2010, which claims priority from Australian Patent Application No. AU 2009900306, filed on Jan. 28, 2009, the disclosures of which are hereby incorporated herein by reference in their entireties.

FIELD OF THE INVENTION

The present invention relates to a wear resistant pipe fitting suitable for use in a pipe for conveying slurry from one location to another. The present invention further relates to a non-linear pipe segment or "elbow" which alters the direction of flow of a slurry being conveyed within a pipe.

BACKGROUND OF THE INVENTION

The transport of a slurry comprising a moving fluid carrying suspended solid particles through a closed conduit or pipeline has long been known in the mining, energy, chemical and related industries. It is well know that slurry pipelines are prone to wear in service. Slurry pipelines often incorporate linear pipe segments arranged end to end as well as non-linear pipe bends or "elbows", which join the linear or straight pipe sections to one another at various angles, to alter the direction of flow of the material being conveyed within the pipeline. When a moving fluid carrying suspended solid particles is forced to change direction, it is easier to change the direction of flow of the fluid than it is to change the direction of the movement of the suspended solid particles. When the particulate material being transported in slurry form is abrasive in nature and the direction of flow of the slurry is altered, it is well established that wear of the interior sidewalls of the elbow occurs, as the suspended solid particles tend to continue to travel on their original straight line trajectory and impinge on the internal wall(s) of the elbow causing erosion or wear. When the damage caused by wear is sufficiently high, the elbows require replacement or repair.

Attempts have been made in the past to reduce or eliminate the erosion of non-linear slurry pipe segments or elbows. Some attempts are based on altering the shape of the elbow. By way of example, U.S. Pat. No. 4,387,914 discloses an elbow having an enlarged vortex chamber aligned with the entry axis to collect material and to form a vortex within the chamber thereby preventing conveyed material from hitting the walls of the elbow by causing it to deflect off—the soft-plug of—material already collected in the chamber. U.S. Pat. No. 4,995,645 describes an elbow in which a section of the elbow between an inlet and outlet opening has a cross-sectional area that is at least 1.5:1 greater than the cross-sectional area of the inlet and outlet openings in an attempt to reduce the wear of the elbow wall caused by the material conveyed therein. U.S. Pat. No. 4,641,864 and U.S. Pat. No. 4,767,243 disclose pipe bends or elbows which cause the conveyed material to form a cushion of that material to prevent erosion of the walls of the conveying system. U.S. Pat. No. 1,518,705 discloses a pipe having a plurality of corrugations cast integral with the interior walls of said pipe. The corrugations are positioned with an angle less than 180 degrees in the upper and lower portions of said pipe.

The most commonly adopted approach to addressing this problem is the use of a liner positioned within the elbow segment of the pipe and fabricated from an elastomeric material to absorb the impact of the particles or fabricated using a material having a higher level of abrasion or erosion resistance than the remainder of the pipe. Examples of such solutions are described in: U.S. Pat. No. 4,199,010; U.S. Pat. No. 4,554,721; U.S. Pat. No. 4,733,889; U.S. Pat. No. 3,350,832; and, U.S. Pat. No. 1,246,189. The devices disclosed in the afore-mentioned patents differ from one another principally in the selection of the material of construction of the liners, and in the manner of affixing the liners to the elbow. The use of a separate liner incorporated into an elbow can be relatively expensive, depending on the cost of the materials of construction, and does not stop the occurrence of significant wear over an extended period of time. The removal and subsequent replacement of the liner can be difficult and costly, requiring the pipeline to be taken off-line to allow access to the liner which can lead to a loss in production.

For the foregoing reasons, there remains a need to provide a pipe fitting for slurry transporting pipes and pipe lines which has improved wear and abrasion resistance.

SUMMARY OF THE INVENTION

According to a first aspect of the present invention there is provided a wear resistant pipe fitting having an inlet end in fluid communication, in use, with a first linear pipe segment, and an outlet end in fluid communication, in use, with a second linear pipe segment, the pipe fitting comprising:
  a first eccentric reducer arranged to receive a slurry or pipeline fluid from the first linear pipe section and deliver the slurry or pipeline fluid to a second eccentric reducer;
  the second eccentric reducer arranged to receive the slurry or fluid from the first eccentric reducer and deliver the slurry or pipeline fluid to the second linear pipe section; and,
  a flow interrupter device positioned within the first eccentric reducer for disrupting the flow of the slurry or pipeline fluid before the slurry or fluid enters the second eccentric reducer.

In one form, the first linear pipe segment has a central axis and the flow interrupter device may be disposed at a height below the central axis of the first linear pipe segment. This form is of the present invention is advantageous for pipe fittings which run substantially horizontally relative to the ground. Alternatively, the first linear pipe segment has a central axis and the flow interrupter device may be disposed at the height of the central axis of the first linear pipe segment. This form of the present invention is advantageous for pipe fittings which run substantially vertically relative to the ground.

In one form, the flow interrupter device is in the form of an elongate probe or rod-like device. The flow interrupter device may be cylindrical, polygonal, triangular, or elliptical in cross-section. The flow interrupter device may have a non-uniform cross-section.

Advantageously, the flow interrupter device may include a means for injecting a fluid into the slurry or pipeline fluid flowing through the pipe fitting. In this way the injected fluid may be mixed into the slurry or pipeline fluid.

In one form, the flow interrupter device has a first end terminating in a leading edge and whereby, in use, the leading edge is the portion of the flow interrupter device which the slurry or pipeline fluid encounters first as it travels through the pipe fitting. The pipe fitting may further comprise a fastening means for securing the position of the flow interrupter device in the pipe fitting.

In one form, the first eccentric reducer has a straight side and a tapered side, and the straight side of the first eccentric reducer is positioned in use, to be in alignment with a first side of the first linear pipe segment. Analogously, the second eccentric reducer may have a straight side and a tapered side, and the straight side of the second eccentric reducer is positioned in use, to be in alignment with a first side of the second linear pipe segment.

In one form, the pipe fitting further comprises a transition segment arranged between the first eccentric reducer and the second eccentric reducer, the transition segment having a larger cross-sectional area than the cross-sectional area of the first linear pipe segment whereby the velocity of the slurry or pipeline fluid is lower in the transition segment than the velocity of the slurry or pipeline fluid in the first linear pipe segment. The flow interrupter device may be positioned totally or partially within the first eccentric reducer and extends partially within the transition segment.

The transition segment may be a linear transition segment. Alternatively, the transition segment may be a pipe bend segment whereby, in use, the slurry or pipeline fluid is caused to change direction as it flows from the first eccentric reducer into and through the pipe bend segment before being discharged into a second eccentric reducer.

In one form, each of the first and second eccentric reducers has a straight side and a tapered side, and the tapered side of each of the first and second eccentric reducers is arranged, in use, to be closest to the centre of curvature of the pipe bend segment whilst the straight side is arranged to be further away from the centre of curvature.

In one form, the pipe fitting may include a means for adjusting the depth of penetration of the flow interrupter device within the first eccentric reducer. In one form, the maximum depth of penetration of the flow interrupter device is determined as the depth at which the cross-sectional area of the first eccentric reducer minus the cross-sectional area of the leading edge of the flow interrupter device is greater than the cross-sectional area of the first linear pipe segment.

In one form, the flow interrupter device is hollow along part or all of the length of the flow interrupter device.

The pipe fitting may be made from polymeric materials such as PVC, PTFE, VITON (i.e., a fluoroelastomer commercially available under the commercial trademark VITON), rubber, silicone, polyethylene, or polystyrene or metallic materials such as aluminium and its alloys, nickel and its alloys, copper and its alloys, cast iron, mild steel, stainless steel, or titanium and its alloys.

According to a second aspect of the present invention there is provided a wear resistant pipe fitting substantially as herein described with reference to and as illustrated in the accompanying illustrations.

DESCRIPTION OF THE DRAWINGS

In order that the invention may be more readily understood, an embodiment of the invention will now be described with reference to the accompanying drawings, in which.

DETAILED DESCRIPTION OF EMBODIMENTS

Embodiments of the wear resistant elbow of the present invention will now be described, with particular reference to the use of a pipeline to convey a slurry, by way of example only. In the embodiments described in detail below, by way of example, the slurry comprises solid particles suspended in a liquid. Throughout this specification, the term "slurry" refers to a fluid containing particulates or like material in solid form and the "fluid" can be in gaseous or liquid form. It is to be clearly understood that the pipe fitting of the present invention is also applicable for use in a pipeline conveying a simple pipeline fluid which does not contain particulates or like material in solid form. Unless defined otherwise, all technical and scientific terms used herein have the same meanings as commonly understood by one of ordinary skill in the art to which this invention belongs. In the drawings, like reference numbers refer to like members.

The term "pipe" as used throughout this specification refers to a conduit suitable for transporting a fluid or a slurry from one location to another location. A "fluid" may be a gas or a liquid. The pipe may be cylindrical in cross-section but this is not essential. The pipe could equally be polygonal, rectangular, square, or elliptical in cross-section. A "pipe segment" is a section of a "pipe". A "pipe fitting" is pipe segment that is inserted into a pipe. The pipe fitting may be a detachable or removable pipe segment or fixed in position after insertion using, by way of example, welding.

The term "elbow" refers to a non-linear segment of a pipe or conduit which is used to change the direction of flow of a slurry. The term "pipe bend segment" refers to a segment of pipe which is curved or arched.

The term "reducer" refers to a pipe fitting that is used to join two pipes or pipe segments of unequal sizes. A reducer can be concentric or eccentric as defined below.

The term "concentric reducer" is used to refer to a frustoconical pipe fitting that is used to join unequal sized pipes (or pipe segments) in circumstances where the inlet and outlet ends of the unequal sized pipes share a common centreline.

The term "eccentric reducer" is used to refer to a pipe fitting that is used to join unequal sized pipes (or pipe segments) in circumstances where the centre line of the smaller of the two unequal sized pipes (or pipe segments) is off-centre (or offset) relative to the centre line of the larger of the two unequal sized pipes (or pipe segments). An eccentric reducer has a "straight side" and a "tapered side", the tapered side diverging from the straight side at a constant angle such that one end of the eccentric reducer is larger in cross-section than the other end. In use, the straight side is positioned to be in alignment with one side of the two unequal sized pipes (or pipe segments). When an eccentric reducer is used to connect two linear pipe segments with each other, the centre lines of the two linear pipe segments are offset from each other by a distance that is dependent on the differential in the size of the two unequal pipes (or pipe segments).

The term "wear" as used throughout this specification refers to the undesirable removal of material from the surface of a body by mechanical means. The term "erosion" as used throughout this specification refers to wear which occurs as a result of flow a material across a surface Referring now to the FIG. 1, a first embodiment of the wear resistant pipe fitting (10) of the present invention is disclosed in the form of an elbow for changing the direction of flow of a slurry through a pipe. The elbow (10) has an inlet end (12) and an outlet end (14). Although the liquid and the suspended solid particles of the slurry being transported through the elbow are not shown in the Figures, the general direction of the flow of the slurry is from the inlet end (12) towards the outlet end (14). In the embodiment illustrated in FIG. 1, the elbow changes the direction of flow of the slurry through an angle of 90 degrees. Whilst it is to be understood that this angle of direction of change of flow of the slurry through the elbow can vary widely depending on the particular change of direction required for the slurry pipeline, it is a matter of routine in pipeline design to use elbows that change the direction of flow of the slurry through an angle of 45 degrees or 90 degrees.

In use, the elbow (10) is connected at its inlet end (12) to a first linear pipe segment (16) using any suitable connector. In the embodiment illustrated in FIG. 1, a flange (20) is provided at each of the inlet and outlet ends (12 and 14, respectively) of the elbow (10) to facilitate ease of coupling of the inlet end (12) to the first linear pipe segment (16), the outlet end (14) of the elbow (10) being analogously coupled to a second linear pipe segment (18). To avoid an overall change in pressure as the slurry flow through the elbow, the first and second linear pipe segments (16 and 18, respectively) are of matching sizes. More specifically, the internal cross-sectional area of the first linear pipe segment (16) is equal to the internal cross-sectional area of the second linear pipe segment (18). Using this arrangement, the velocity of the slurry as it enters the elbow is the same as the velocity of the slurry as it leaves the elbow. This velocity is hereinafter referred to as "the line velocity".

Figures 1, 2, 3:
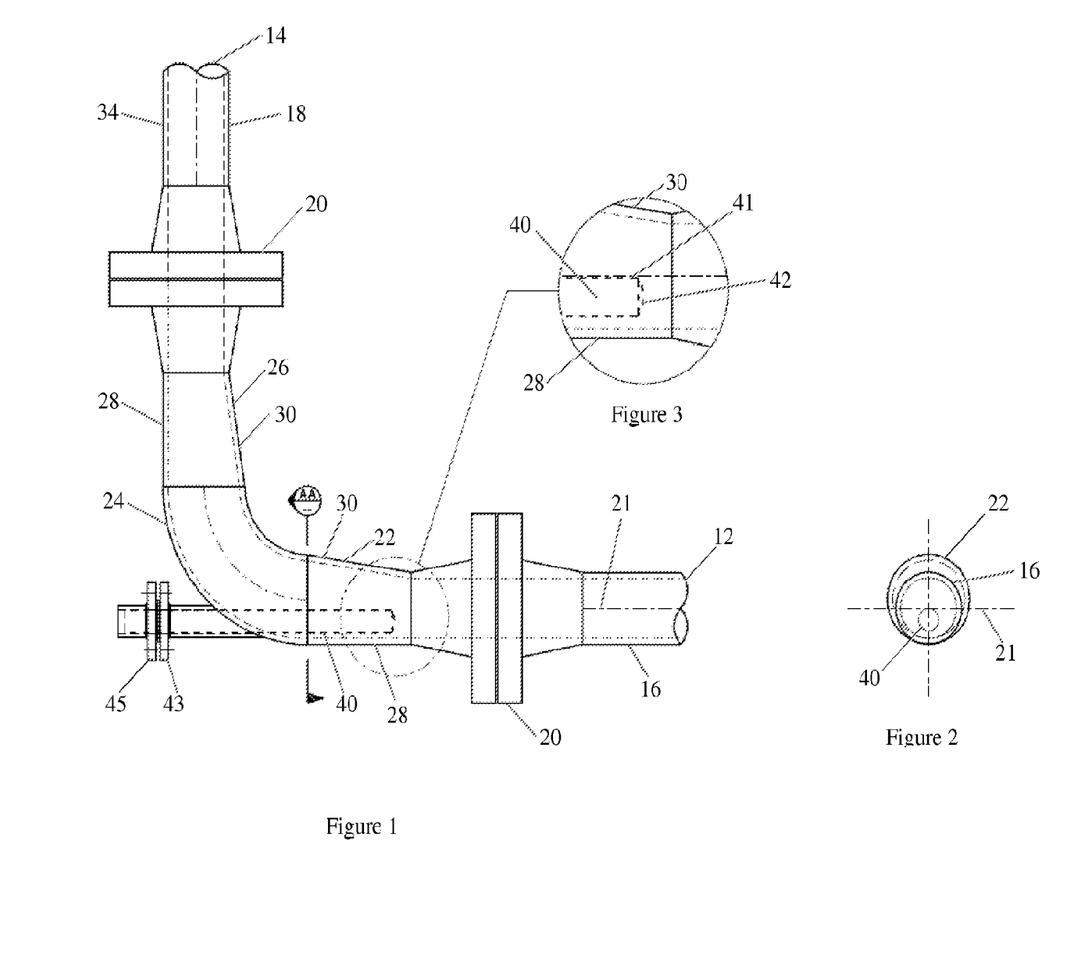
FIG. 1 is a side elevation of a first embodiment of the pipe fitting of the present invention in the form of an elbow.
FIG. 2 is a cross-sectional view taken through the section marked A-A in FIG. 1.
FIG. 3 is a magnified view of one section of the elbow of FIG. 1 showing the leading edge of the flow interrupter device.

With reference to FIG. 1, the elbow (10) has three main sections. The elbow (10) is provided with a first eccentric reducer (22) arranged to receive slurry from the first linear pipe section (16) and deliver the slurry to a pipe bend segment (24), the pipe bend segment being of larger size than the first linear pipe section (16). The slurry is caused to change direction as it flows through the pipe bend segment (24) before being discharged into a second eccentric reducer (26). The second eccentric reducer (26) is arranged to receive the slurry from the pipe bend segment (24) and deliver the slurry to the second linear pipe section (18).

It is readily apparent from FIG. 1, that each of the first and second eccentric reducers (22 and 26, respectively) is being used to join unequal sized pipe segments. The first eccentric reducer (22) is being used to join the smaller diameter first linear pipe segment (16) to the larger diameter pipe bend segment (24) whilst the second eccentric reducer (26) is being used to join the larger diameter pipe bend segment (24) to the smaller diameter second linear pipe segment (18). In each case, the centre line of the smaller of the two unequal sized pipe segments is offset relative to the centre line of the larger of the two unequal sized pipe segments as best seen in FIG. 2.

In use, the line velocity of the slurry starts to be reduced as it enters into the first eccentric reducer (22). The reason for the reduction in the line velocity is the increase in the cross-sectional area. As the slurry travels along the length of the first eccentric reducer (22) the cross-sectional area continues to increase and the velocity of the slurry continue to decrease. The velocity of the slurry as it travels around the pipe bend segment (24) is essentially constant because the cross-sectional area of the pipe bend segment (24) remains uniform along its length. This constant velocity is hereinafter referred to as "the transitional velocity". The velocity of the slurry is increased from the transitional velocity back to the line velocity as the slurry travels through the second eccentric reducer (26). The reason for the increase in the velocity is the decrease in the cross-sectional area. The velocity of the slurry has thus been returned back to line velocity by the time the slurry flows into the second linear pipe segment (18).

In the "Background to the Invention" section above, it was described that, it is well established that wear of the interior sidewalls of prior art slurry pipeline elbows occurs as the suspended solid particles tend to continue to travel on their original straight line trajectory and impinge on the internal wall(s) of the elbow causing erosion or wear. The reduction in wear achieved using the elbow of the present invention occurs in part due to the transitional velocity being less than the line velocity. More importantly, however, the present invention is based, at least in part, upon an observation that when a slurry is transported along a slurry pipeline, the suspended solid particles tend to segregate under gravity within the moving fluid, resulting in a local change in the effective density of the slurry as measured across any given cross-section of the pipeline. These regions of higher density occur irrespective of the orientation, in use, of the elbow. Thus, when viewed in cross-section under normal pipeline flow conditions, the solid particles suspended in the fluid tend to separate under the influence of gravity into pseudo-layers within the slurry, forming a region of higher effective density towards the lowermost portion of any given cross-section of the pipeline, transitioning through to a region of lower effective density towards an uppermost portion of any given cross-section of the pipeline.

Thus, as an important novel feature of the present invention, a flow interrupter device (40) is positioned within the elbow (10). The function of the flow interrupter device (40) is to disrupt the trajectory of the particulates within the slurry just after the slurry enters the first eccentric reducer (22) and before the slurry enters the pipe bend segment (24). Without wishing to be bound by theory, the flow interrupter device (40) also creates a downstream region of low pressure, which is understood to create flow patterns that encourage mixing of the slurry downstream of the flow interrupter device. With reference to FIG. 2, the first linear pipe segment (16) has a central axis (21) aligned in the general direction of flow of slurry or fluid through the first linear pipe segment (16). In FIG. 2, the flow interrupter device (40) is disposed at such a height relative to the central axis (21) of the first linear pipe segment (16) so as to cause maximum disruption to the pseudo layers within the slurry where the density of solids is highest. The flow interrupter device (40) could be disposed at height below the central axis (21) of the first linear pipe segment (16), however, depending on the density of the slurry being transported through the slurry pipeline and the angle of the elbow being used. This disruption improves the homogeneity of the slurry such that any impact of particulates on the internal surface of the pipe bend segment (24) is more evenly distributed.

Figure 11:
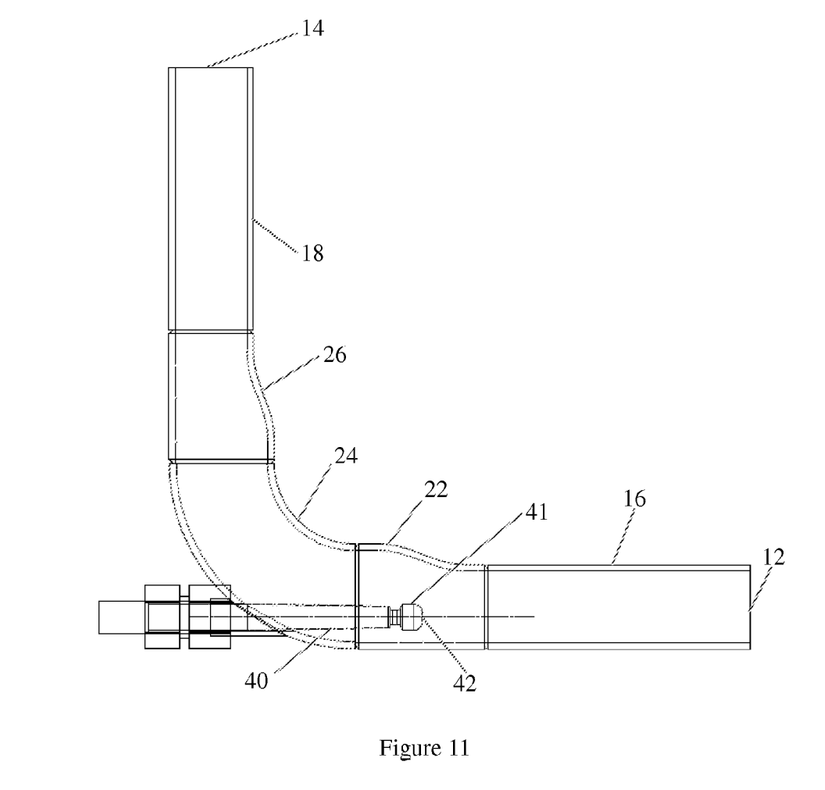
FIG. 11 is a side elevation of a fourth embodiment of the pipe fitting of the present invention in which the flow interrupter device is non-uniform in cross-section.
Figure 12A:
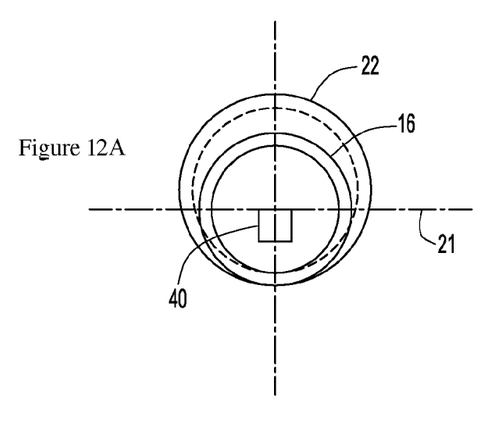
FIGS. 12A-12C are cross-sectional views taken through the section marked A-A in FIG. 1 and depicted alternative embodiments of the flow interrupter device.
Figure 12B:
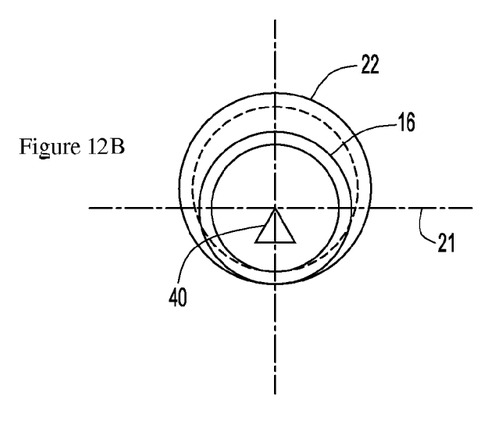
Figure 12C:
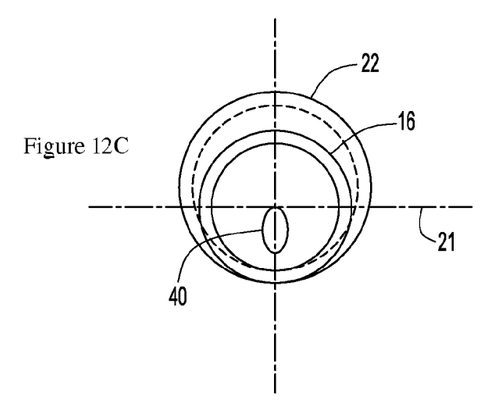

In the embodiment illustrated in FIGS. 1 and 2, the flow interrupter device (40) is in the form of an elongate cylindrical probe or rod-like device. The flow interrupter device (40) can equally be polygonal, triangular, or elliptical in cross-section and the cross-section may vary along the length of the flow interrupter device (40) as illustrated in FIG. 11 and also FIGS. 12A-12C. If desired, the flow interrupter device may be hollow along part or all of its length. The flow interrupter device (40) has a first end (41) terminating in a leading edge (42). The leading edge (42) is that portion of the flow interrupter device (40) which the slurry encounters first as it travels through the elbow (10). If desired, the leading edge (42) can be constructed of a material which is more resistant to abrasion than the remainder of the flow interrupter or indeed the rest of the elbow. Although providing the leading edge with an abrasion resistant material can be accomplished in various ways, one way in which this can be achieved is to clad the leading edge of the flow interrupter with a cladding using, for example a suitable hardfacing composition such as STELLITE or CERAMIC. In testing of embodiments of the elbow (described in greater detail below), wear on the leading edge (42) of the flow interrupter device (40) was found not to be excessive for a high impact zone.

The first eccentric reducer (22) has a straight side (28) and a tapered side (30). As is best seen using a combination of FIGS. 1 and 2, the straight side (28) of the first eccentric reducer (22) is positioned in use, to be in alignment with a first side (32) of the first linear pipe segment (16). In an analogous manner, the second eccentric reducer (26) has a straight side (28) and a tapered side (30). Without the flow interrupter device (40) in place within the elbow (10), the progressive increase in cross-sectional area which occurs along the length of the first eccentric reducer (22) would cause a progressive reduction in the velocity of the slurry as it travels along the length of the first eccentric reducer (22), reaching the transitional velocity upon entry into the pipe bend segment (24). The presence of the flow interrupter device (40) causes a local reduction in the overall cross-sectional area of first eccentric reducer (22) which is a function of the cross-sectional area occupied by the flow interrupter device itself. For this reason, the leading edge (42) of the flow interrupter device (40) should not be positioned within the first linear pipe section (16).

The elbow (10) is provided with a fastening means (43) for securing the flow interrupter device (40) in position. The location of the flow interrupter device (40) may vary in that it may be positioned totally or partially within the first eccentric reducer (22) and may extend partially within the pipe bend segment (24) when the pipe fitting (10) is an elbow. In the embodiment illustrated in FIG. 1, the fastening means (43) takes the form of a fluid-tight sealing means and a locking means, in this example, a threaded adapter which allows for removal and replacement of the flow interrupter device (40) without the need to disconnect the elbow (10) from the first and second linear pipe segments (16 and 18, respectively).

Figure 5:
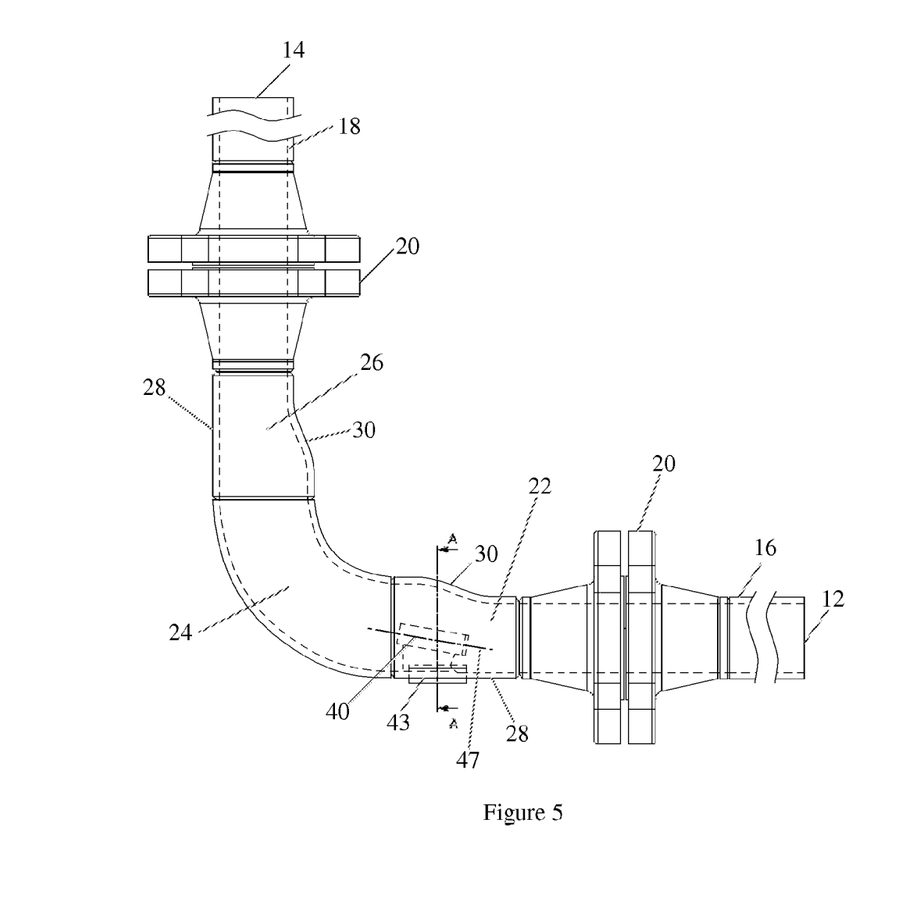
FIG. 5 is a side elevation of an alternative embodiment of the elbow of FIG. 1 in which the flow interrupter device is arranged at an angle.
Figure 6:
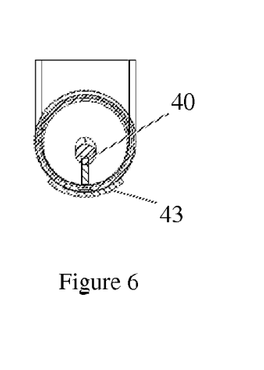
FIG. 6 is a cross-sectional view taken through the section marked A-A in FIG. 5.

In the embodiment illustrated in FIG. 5 for which like reference numerals refer to like parts, the fastening means (43) is secured in position along the straight side (28) of the first eccentric reducer (22). In the embodiment, the fastening means (43) takes the form of a suitably curved welded plate which may be further provided with means for adjusting the angle (47) of the flow interrupter device (40) relative to the straight side (28) of the first eccentric reducer (22). Setting up the flow interrupter device at an angle in this way assists in disrupting more layers of the slurry as it passes by the flow interrupter device (40), encouraging greater mixing downstream of the flow interrupter device (40).

If desired, the elbow (10) may be provided with means for adjusting the depth (45) of penetration of the flow interrupter device (40) within the first eccentric reducer (22). By way of example, the means for adjusting the depth of penetration can be a packing gland including a locking means for adjustably fixing the position of the interrupter device at a selected depth of penetration, and a sealing means for preventing egress of fluid out of the elbow. In this way, the leading edge (42) of the flow interrupter device (40) can be moved closer to the first linear pipe segment (16) or closer to the pipe bend segment (24) as desired. For best results, the maximum depth of penetration of the leading edge (42) of the flow interrupter device (40) is determined as the depth at which the cross-sectional area of the first eccentric reducer (22) minus the cross-sectional area of the leading edge (42) is greater than the cross-sectional area of the first linear pipe segment (16). It is at this depth that the first reduction in the velocity of the slurry occurs.

The straight side (28) of the second eccentric reducer (26) is positioned in use, to be in alignment with a first side (34) of the second linear pipe segment (18). In both cases, the tapered side (30) of each of the first and second eccentric reducers (22 and 26, respectively) is arranged to be closest to the centre of curvature of the elbow (10) whilst the straight side (28) is arranged to be further away from the centre of curvature. This arrangement is used to reduce turbulence within the pipe bend segment (24) as the fluid enters the bend and exits the bend. In circumstances when the slurry enters the bend segment (24) on a trajectory that is biased to one side, the tapered side (30) should be oriented to minimise the formation of eddy currents in the bend segment (24).

Figure 7:
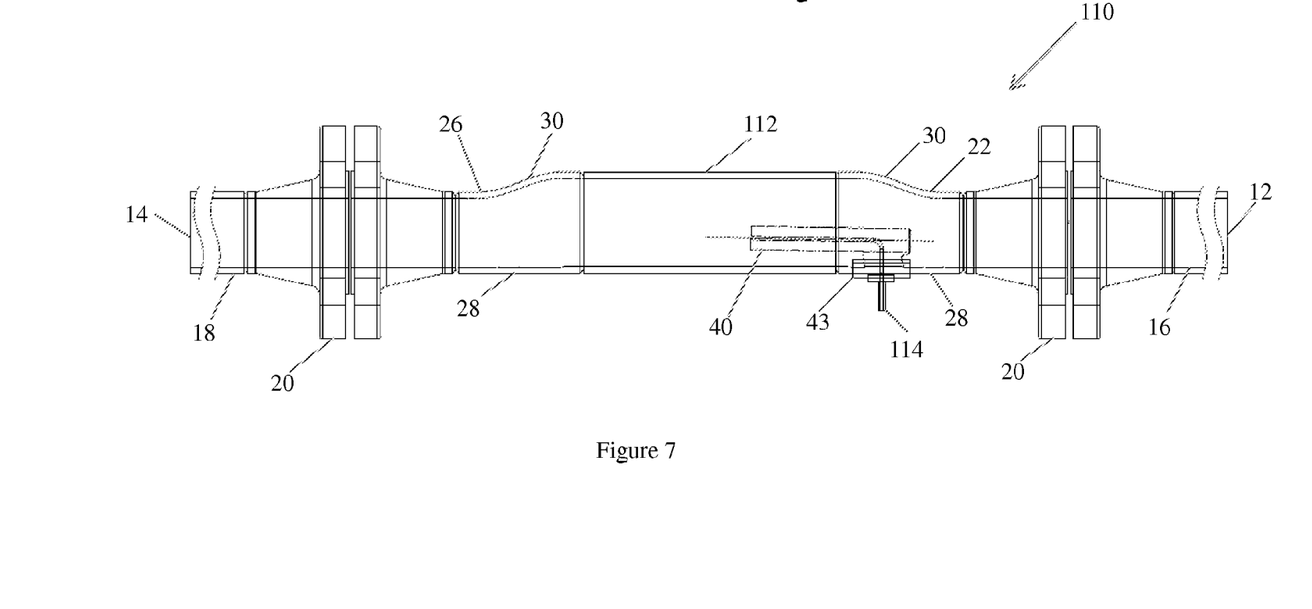
FIG. 7 is a side elevation of a second embodiment of the pipe fitting of the present invention in which the pipe fitting is linear and includes a means for injecting a fluid.
Figure 8:
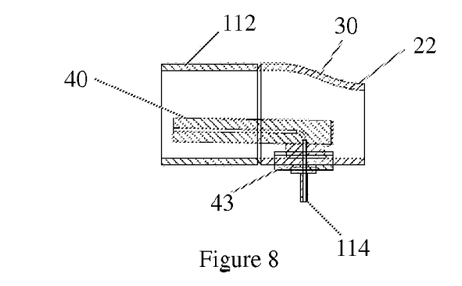
FIG. 8 illustrates in greater detail the means for injecting a fluid of FIG. 6.

Referring now to FIGS. 7 and 8, a second embodiment of the wear resistant pipe fitting (10) of the present invention is disclosed for which like reference numerals refer to like parts. In this embodiment, the wear resistant pipe fitting is in the form of a linear pipe segment (110). In this embodiment, the general direction of the flow of the slurry is from the inlet end (12) towards the outlet end (14). In this embodiment, as the pipe segment (110) is linear, the overall direction of flow of the slurry through the pipe remains unchanged. In use, the pipe fitting (110) is connected at its inlet end (12) to a first linear pipe segment (16) using any suitable connector, such as the flange (20) illustrated in FIG. 7, the outlet end (14) of the pipe fitting (10) being analogously coupled to a second linear pipe segment (18). To avoid an overall change in pressure as the slurry flow through the pipe fitting, the first and second linear pipe segments (16 and 18, respectively) are of matching sizes. More specifically, the internal cross-sectional area of the first linear pipe segment (16) is equal to the internal cross-sectional area of the second linear pipe segment (18). Using this arrangement, the line velocity of the slurry as it enters the pipe fitting (110) is the same as the velocity of the slurry as it leaves the pipe fitting.

With reference to FIG. 7, the pipe fitting (110) has three main sections—a first eccentric reducer (22) arranged to receive slurry from the first linear pipe section (16) and deliver the slurry to a linear transition segment (112), the linear transition segment being of larger size (and cross-sectional area) than the first linear pipe section (16). In this way, the line velocity of the slurry is caused to drop from the line velocity to the transitional velocity as it flows into the linear transition segment (112) and then increase again from the transitional velocity to the line velocity as it flows out of the linear transition segment (112) and through the second eccentric reducer (26). The second eccentric reducer (26) is arranged to receive the slurry from the linear pipe segment (112) and deliver the slurry to the second linear pipe section (18).

The flow interrupter device (40) is positioned within the linear pipe fitting (110) to disrupt the trajectory of the particulates within the slurry as the slurry passes through the first eccentric reducer (22) and into the linear transition segment (112), in an analogous manner to that described above in relation to the first embodiment. Using this second embodiment of the present invention, a reduction in wear is achieved using the pipe fitting of the present invention because the drop in pressure caused by the presence of the flow interrupter (40) coupled with the change in velocity to and from the line velocity and the transitional velocity causes mixing of the slurry as it passes through the pipe fitting (110). This results in homogenisation of the suspended solid particles which otherwise tend to segregate under gravity within the moving fluid, resulting in a local change in the effective density of the slurry as measured across any given cross-section of the pipeline. This disruption improves the homogeneity of the slurry both within and downstream of the linear transition segment (112) such that any impact of particulates on the internal surface of the pipe is more evenly distributed.

In this second embodiment, the fastening means (43) for securing the flow interrupter device (40) in position is located within the first eccentric reducer (22) but the length of the flow interrupter device (40) is sufficiently long that it extends into the linear transition segment (112). The location of the flow interrupter device (40) may vary in that it may be positioned totally or partially within the first eccentric reducer (22). The flow interrupter device may extend partially within the linear transition segment (112), depending on the degree of disruption to the flow of slurry that needs to be achieved to effect mixing, but it is equally permissible for the flow interrupter device (40) to be located wholly within the first eccentric reducer (22).

With reference to FIGS. 7 and 8, the flow interrupter device (40) is further provided with means (114) for injecting a fluid into the slurry to allow for the introduction of, for example, a flocculating agent to be added to a fluid or slurry as it passes through the pipe fitting (110). In this way, the pipe fitting may be used as the inlet pipe for a thickener or clarifier (not shown). Using the pipe fitting of the present invention, the fluid injected into the fluid or slurry in this way is advantageously mixed through the fluid or slurry downstream of the flow interrupter device (40). In this way, the fluid injected via the flow interrupter device (40) is injected into a turbulent zone where mixing is encouraged.

Figure 9:
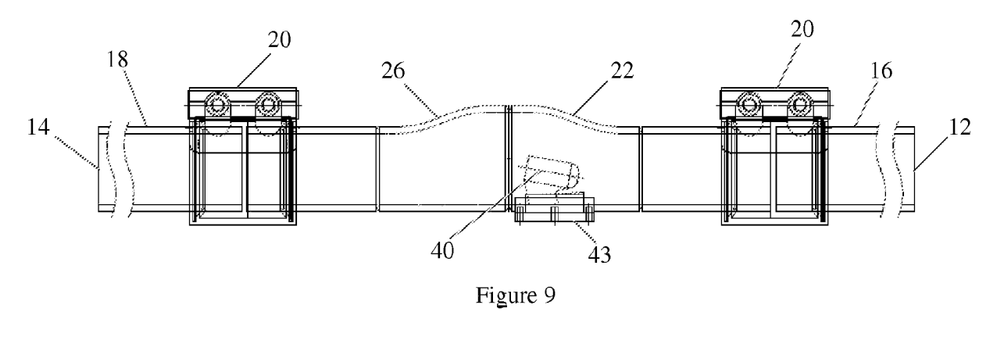
FIG. 9 is a side elevation of a third embodiment of the pipe fitting of the present invention in which the pipe fitting is linear but does not include a transition segment.
Figure 10:
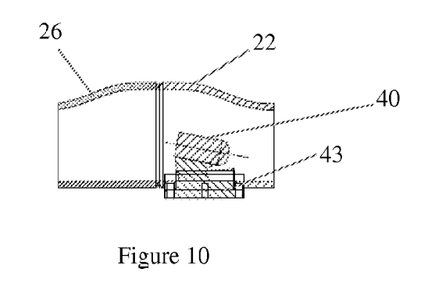
FIG. 10 illustrates in greater detail the flow interrupter device of FIG. 9.

With reference to FIGS. 9 and 10, a third embodiment of the wear resistant pipe fitting (10) of the present invention is disclosed for which like reference numerals refer to like parts. In this embodiment, the wear resistant pipe fitting is again in the form of a linear pipe segment (110), with the general direction of the flow of the slurry is from the inlet end (12) towards the outlet end (14). In use, the pipe fitting (110) is connected at its inlet end (12) to a first linear pipe segment (16) using any suitable connector (20), in this example, a band strap in combination with a sealing means in the form of a rubber clamp, the outlet end (14) of the pipe fitting (10) being analogously coupled to a second linear pipe segment (18). To avoid an overall change in pressure as the slurry flow through the elbow, the first and second linear pipe segments (16 and 18, respectively) are of matching sizes. More specifically, the internal cross-sectional area of the first linear pipe segment (16) is equal to the internal cross-sectional area of the second linear pipe segment (18). Using this arrangement, the line velocity of the slurry as it enters the pipe fitting (110) is the same as the velocity of the slurry as it leaves the pipe fitting.

With reference to FIG. 8, the pipe fitting (110) has only two main sections—the first eccentric reducer (22) being arranged to receive slurry from the second eccentric reducer (26). In this embodiment, the flow interrupter device (40) is positioned within the first eccentric reducer (22). In this third embodiment, the fastening means (43) for securing the flow interrupter device (40) in position is located within the first eccentric reducer (22) and secured in position along the straight side (28) of the first eccentric reducer (22) in an analogous manner to the embodiment illustrated in FIG. 5. In this third embodiment, the fastening means (43) is analogously provided with means for adjusting the angle (47) of the flow interrupter device (40) relative to the straight side (28) of the first eccentric reducer (22). This assists in disrupting more layers of the slurry as it passes by the flow interrupter device (40).

With reference to FIG. 11, a fourth embodiment of the wear resistant pipe fitting (10) of the present invention is disclosed for which like reference numerals refer to like parts. In this embodiment, in use, the pipe fitting (10) is connected at its inlet end (12) to a first linear pipe segment (16) by welding, the outlet end (14) of the pipe fitting (10) being analogously coupled to a second linear pipe segment (18).

It is to be understood that for any of the embodiments described above, the length of the flow interrupter device (40) may vary. In one form, the length of the flow interrupter device (40) is equal to the length of the straight side (28) of the first eccentric reducer (22). Alternatively, the length of the flow interrupter device (40) may be not less than 75%, not less than 50% or not less than 25% of the length of the straight side (28) of the first eccentric reducer (22).

The pipe fitting or pipe segment may be made from polymeric materials such as PVC, PTFE, VITON (i.e., a fluoroelastomer commercially available under the commercial trademark VITON), rubber, silicone, polyethylene, or polystyrene or metallic materials such as aluminium and its alloys, nickel and its alloys, copper and its alloys, cast iron, mild steel, stainless steel, or titanium and its alloys.

The following example is further illustrative of one embodiment of the present invention. The flow rates, sizes and slurry density described in the examples are exemplary only and various modifications can be derived in view of the foregoing disclosure within the scope of the invention. To confirm that the desired effect is produced by the flow interrupter device, tests have been conducted as described in detail below. It will be evident to persons skilled in the art that the results illustrate a significant reduction in wear.

Example 1

Figure 4:
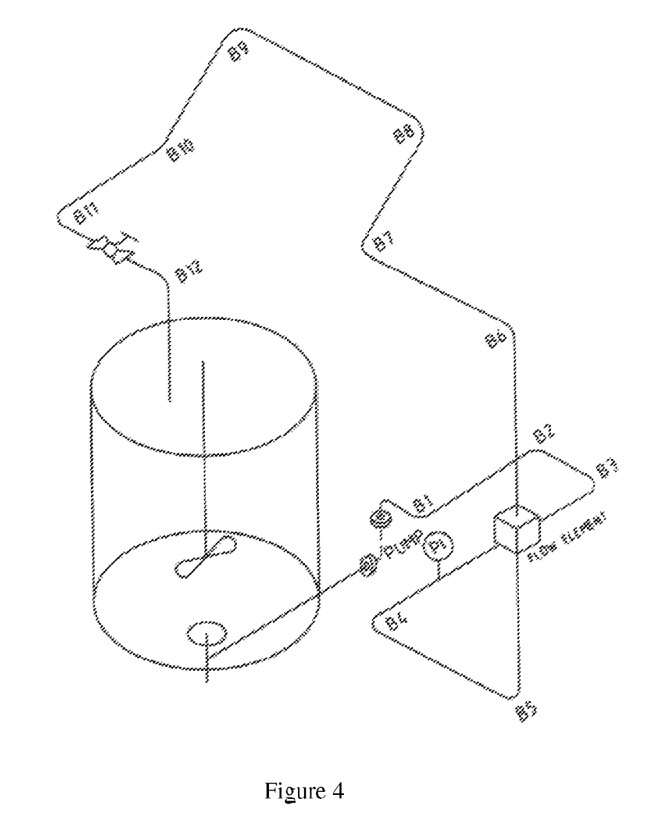
FIG. 4 illustrates the pipeline circuit used for testing according to Example 1.

430 liters of a slurry was provided in an agitated slurry return tank and pumped around a pipeline loop through a series of bends to test a number of different bend segment configurations as shown in FIG. 4. The slurry was made up of solids in the form of sand and garnet in water as the fluid. The overall density of the slurry was 2.41 kg/liter with solids representing approximately 18 wt % of slurry. The line velocity of the slurry entering the first pipeline segment was set at 2.65 meters per second.

The pipeline had a nominal bore of 40 mm. The outer diameter of the pipe was 48.30 mm with a wall thickness of 3.8 mm, resulting in a nominal internal diameter of 40.84 mm. The cross-sectional area of the elbow measured at the first linear pipe segment was thus 1309.97 square millimeters.

The pipe bend segment has a nominal bore of 50 mm. The outer diameter of the pipe bend segment is 60.30 mm, the wall thickness is 3.91 mm, and the inner diameter of the pipe bend segment is 52.48 mm. The cross-sectional area of the pipe bend segment is 2163.11 square millimeters. The transitional velocity (velocity of the slurry as it passes through the pipe bend segment) is 1.61 m/sec.

The flow interrupter device had a nominal diameter of 15.10 mm. As a result it occupies a cross-sectional area of 179.08 square millimeters. The flow interrupter device was positioned at a point where the velocity at the leading edge was calculated to be 2.33 m/sec. The depth of penetration of the leading edge of the flow interrupter device was set at that depth where the internal diameter of the first eccentric reducer was 43.54 mm Prior to testing, the interior surface of the elbow was painted with a plurality of layers of paint of different colours. The slurry was run through the pipeline for a total of 206 hours. The test was suspended after 92 hours of continuous running time to allow for the interior surfaces of the pipeline to be examined for signs of wear. It was observed that when the flow interrupter device was present during testing, that minimal layers of paint were removed. The test was then resumed for a further 355 hours. At the conclusion of the testing, the interior surfaces of the pipeline were again examined for signs of wear. It was observed that when the flow interrupter device was present during testing, that minimal layers of paint were removed by wear compared with a slurry pipeline without the flow interrupter device operated under the same conditions, with only some delamination being observed.

The test was repeated without the flow interrupter device being present. At the conclusion of testing for the same duration of time, it was observed that all of the layers of paint had been removed on the interior of the pipe bend segment. The greatest area of wear was observed within the interior sidewalls of the bend pipe segment.

The initial test results were measured for an elbow arranged vertically to receive slurry through the inlet and change its direction through ninety degrees to flow vertically upwardly. Further tests were conducted for elbows in other orientations with similar results.

Now that the preferred embodiments of the present invention have been described in detail, it should be evident that the present invention has a number of advantages over the prior art, including the following:
a) a marked decrease in the velocity of the particulate matter as it passes from the first linear pipe segment through the first eccentric reducer and into the pipe bend segment, which results in reduced wear and abrasion on the interior walls of the bend segment;
b) relative simplicity of its construction and therefore its relatively low cost;
c) able to replace the flow interrupter device without disconnecting the elbow from the pipeline or having to break the elbow apart into two segments;
d) ability to inject flocculants into a fluid or slurry in an area of high mixing; and,
e) reduces the use of expensive or elaborate multilayer linings.

It will be apparent to persons skilled in the relevant art that numerous variations and modifications can be made without departing from the basic inventive concepts. For example, it is possible for the slurry or fluid to be caused to flow from the first eccentric reducer through a first pipe bend segment and into a second pipe bend segment disposed at a different angle to the first pipe bend segment, prior to the fluid or slurry being caused to flow into the second eccentric reducer. All such modifications and variations are considered to be within the scope of the present invention, the nature of which is to be determined from the foregoing description and the appended claims.

It will be clearly understood that, although a number of prior art publications are referred to herein, this reference does not constitute an admission that any of these documents forms part of the common general knowledge in the art, in Australia or in any other country. In the statement of invention and description of the invention which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed:

1. A wear resistant pipe fitting comprising:
an inlet end;
an outlet end
a first eccentric reducer arranged to receive a slurry or a pipeline fluid from the inlet end and deliver the slurry or the pipeline fluid to a second eccentric reducer, the first eccentric reducer having an increasing cross-sectional area in the direction of fluid flow;
the second eccentric reducer arranged to receive the slurry or the pipeline fluid from the first eccentric reducer and deliver the slurry or the pipeline fluid to the outlet end, the second eccentric reducer having a decreasing cross-sectional area in the direction of fluid flow; and,
a flow interrupter device for disrupting the flow of the slurry or the pipeline fluid before the slurry or the pipeline fluid enters the second eccentric reducer, wherein the flow interrupter device comprises a probe or a rod having a first end terminating in a leading edge positioned within the first eccentric reducer such that, in use, the leading edge is the portion of the flow interrupter device which the slurry or the pipeline fluid encounters first as the slurry or the pipeline fluid travels through the pipe fitting.

2. The wear resistant pipe fitting of claim 1, wherein the inlet end has a central axis and the flow interrupter device is disposed at a height below the central axis of the inlet end.

3. The wear resistant pipe fitting of claim 1, wherein the inlet end has a central axis and the flow interrupter device is disposed at the height of the central axis of the inlet end.

4. The wear resistant pipe fitting of claim 1, wherein the probe comprises an elongate probe.

5. The wear resistant pipe fitting of claim 1, wherein the flow interrupter device is cylindrical, polygonal, triangular, or elliptical in cross-section.

6. The wear resistant pipe fitting of claim 1, wherein the flow interrupter device has a non-uniform cross-section.

7. The wear resistant pipe fitting of claim 1, wherein the flow interrupter device includes a means for injecting a fluid.

8. The wear resistant pipe fitting of claim 1, wherein the rod comprises an elongate rod.

9. The wear resistant pipe fitting of claim 1, further comprising a fastening means for securing the position of the flow interrupter device in the pipe fitting.

10. The wear resistant pipe fitting of claim 1, wherein the first eccentric reducer has a straight side and a tapered side, and the straight side of the first eccentric reducer is positioned in use, to be in alignment with a first side of a first linear pipe segment.

11. The wear resistant pipe fitting of claim 1, wherein the second eccentric reducer has a straight side and a tapered side, and the straight side of the second eccentric reducer is positioned in use, to be in alignment with a first side of a second linear pipe segment.

12. The wear resistant pipe fitting of claim 1, wherein the inlet end has a cross-sectional area and the slurry or the pipeline fluid has a line velocity, in use, as the slurry or the pipeline fluid enters the inlet end of the pipe fitting, the pipe fitting further comprising a transition segment arranged between the first eccentric reducer and the second eccentric reducer, the transition segment having a larger cross-sectional area than the cross-sectional area of the inlet end such that the velocity of the slurry or the pipeline fluid in the transition segment is lower than the line velocity.

13. The wear resistant pipe fitting of claim 12, wherein the transition segment comprises a linear transition segment.

14. The wear resistant pipe fitting of claim 13, wherein the flow interrupter device is positioned partially within the first eccentric reducer and extends partially within the linear transition segment.

15. The wear resistant pipe fitting of claim 12, wherein the transition segment comprises a pipe bend segment such that, in use, the slurry or the pipeline fluid is caused to change direction as it flows from the first eccentric reducer into and through the pipe bend segment before being discharged from the outlet end.

16. The wear resistant pipe fitting of claim 15, wherein the flow interrupter device is (i) positioned totally within the first eccentric reducer or (ii) positioned partially within the first eccentric reducer and extends partially within the pipe bend segment.

17. The wear resistant pipe fitting of claim 15, wherein the pipe bend segment has a center of curvature, and, wherein each of the first and second eccentric reducers has a straight side and a tapered side, and the tapered side of each of the first and second eccentric reducers is arranged, in use, to be closest to the center of curvature of the pipe bend segment while the straight side of each of the first and second eccentric reducers is arranged, in use, to be further away from the center of curvature of the pipe bend segment.

18. The wear resistant pipe fitting of claim 1, wherein the leading edge of the first end of the probe or the rod has a depth of penetration within the first eccentric reducer, and, the pipe fitting includes a means for adjusting the depth of penetration of the flow interrupter device within the first eccentric reducer.

19. The wear resistant pipe fitting of claim 18, wherein the leading edge of the first end of the probe or the rod has a cross-sectional area, and, the inlet end has a cross-sectional area, and, the first eccentric reducer has a variable cross-sectional area, and, wherein the depth of penetration of the flow interrupter device has a maximum depth of penetration determined as the depth of penetration at which the cross-sectional area of the first eccentric reducer minus the cross-sectional area of the leading edge is greater than the cross-sectional area of the inlet end.

20. The wear resistant pipe fitting of claim 1, wherein the flow interrupter device has a length, and the flow interrupter device is hollow along part or all of the length of the flow interrupter device.

* * * * *